Sept. 1, 1931.  E. A. CANNING  1,821,790
FUEL INJECTION VALVE
Filed July 9, 1928   5 Sheets-Sheet 1

Fig. 1

Inventor:
Eugene A. Canning
by Frank M. Slough
his attorney.

Sept. 1, 1931.  E. A. CANNING  1,821,790
FUEL INJECTION VALVE
Filed July 9, 1928  5 Sheets-Sheet 2

Sept. 1, 1931.  E. A. CANNING  1,821,790
FUEL INJECTION VALVE
Filed July 9, 1928    5 Sheets-Sheet 3

Sept. 1, 1931.  E. A. CANNING  1,821,790
FUEL INJECTION VALVE
Filed July 9, 1928  5 Sheets-Sheet 4

Patented Sept. 1, 1931

1,821,790

UNITED STATES PATENT OFFICE

EUGENE A. CANNING, OF EAST CLEVELAND, OHIO, ASSIGNOR TO FRANK BALLOU STEARNS, OF CLEVELAND HEIGHTS, OHIO

FUEL INJECTION VALVE

Application filed July 9, 1928. Serial No. 291,146.

My invention relates to valve operating mechanisms and relates particularly to valve operating mechanisms of a type especially adaptable for use in connection with multi-cylinder solid injection engines.

In multi-cylinder engines, particularly in internal combustion engines of the solid injection type, the injection of the liquid fuel is commonly effected in either of two different ways, the first by what is known as the pump controlled "spring loaded" injection valve system, the other by what is known as the "common rail" system.

In the "spring loaded" valve system, the fuel is taken in by the pump on the suction stroke and rises to a high pressure on the exhaust stroke of the pump, the value of pressure attained being predetermined by the amount of spring loading given the injection valve, which may be set to prevent injection of fuel unless overbalanced by a fuel fluid injection pressure, of, say, a value over 800 lbs. Sometimes a much higher fuel pressure, such as 4000 lbs. is required. The fuel will continue to be injected as long as the fuel pressure effected by the pump remains high enough to overbalance the spring pressure. At some interval of time after the fuel is actually injected, a relief valve on the pump is automatically actuated, and by-passes the fuel under pressure, and the injection valve is closed by the power due to its resiliency, automatically.

In the "common rail" system the fuel is preferably maintained at substantially constant predetermined pressure and injection is effected by a cam periodically opening the needle valve.

In engines of the common rail type, considerable difficulty has heretofore been had in properly throttling the fuel supply, which commonly, in such engines, is supplied separately and successively to each cylinder under individual cam control, through a separate fuel injection valve, at a very high pressure. This pressure may be from one to twenty thousand pounds per square inch, and especially at the higher values of pressure, the valve operation has usually been accomplished more or less irregularly.

An object, therefore, of my present invention is to provide an improved throttling mechanism which may be operated for controlling, in common, the injection of fuel into all of the cylinders, successively, of a multi-cylinder engine.

Another object of my invention is to provide a common controlling mechanism for regulating the injection of fuel, alike, for each of the cylinders of a multi-cylinder engine so that each cylinder may operate at approximately the same load as each of the other cylinders.

Another object of my invention is to provide a common controlling mechanism for regulating the injection of fuel, alike, for each of the cylinders of a multi-cylinder engine and to provide for the fuel injection valve of each cylinder, means which may be separately adjustable to vary the operation of the valve, all being operated in common, so that all cylinders may operate at approximately the same load.

Another object of my invention is to provide a positively operable, closely adjustable, valve controlling, valve operating mechanism for multi-cylinder fuel injection valves.

Another object of my invention is to provide an improved valve controlling and operating mechanism, for engines, whose operation will not be seriously affected by the inertia of moving parts which otherwise would cause an undesirable operation of the engine.

Another object of my invention is to provide a common controlling mechanism for regulating the injection of fuel for the cylinders of a multi-cylinder engine, and to provide improved means which may be separately adjustable to vary the amount of fuel injected at each operation of any particular valve throughout a wide range, from substantially non-injection of fuel to normal fuel injection rates.

Other objects of my invention and the invention itself will become more apparent by reference to the following description and in which description reference will be had to the accompanying drawings forming a part of this specification.

Referring to the drawings:

Fig. 4 is a side elevational view.

Fig. 10 is a horizontal transverse view taken through the twin head of a pair of the engine cylinders, the view being in section for the head portion for one of the cylinders, and in top plan for the head portion for the other cylinder, showing one of the rocker arms and the eccentric supporting shaft therefor, and fuel injection valve.

Figs. 11 and 12 are end and side elevational views respectively, of the eccentric supporting shaft for the rocker arms.

Figs. 13 and 14 are side and end elevational views respectively of the rocker arm adjusting screw.

Figs. 15 and 16 are side and plan views, respectively, of a rocker arm.

Referring to the different figures of drawings in all of which like parts are designated by like reference characters, at 1, I show the crank case for a 6-cylinder internal combustion engine, in which there is journalled at 2, 3 and elsewhere a rotatable crank shaft 4, which carries a fly-wheel at 6, and by a flexible coupling 7, drives the rotor or air pump 8, and which by its intermediate crank, as later described, joins with connecting rods of the six like reciprocable pistons, one of which is shown at 9 and its connecting rod at 10, the pistons are adapted to reciprocate in the cylinder blocks 11, 12, 13, 14, 15 and 16, which are disposed in parallel and in line.

Each of the cylinder blocks comprises a flanged base 17 and flanged top 18, and water jacketed intermediate portion comprising an outer shell 19 and an inner cylinder 20, the cylinder and shell being spaced to provide a channel 21 for conducting cooling water pumped therethrough continuously during operation of the engine in the usual manner for automotive engines.

Each successive pair of cylinders is provided with a common cylinder head, there being, therefore, three cylinder heads for the six cylinders.

Figure 1:
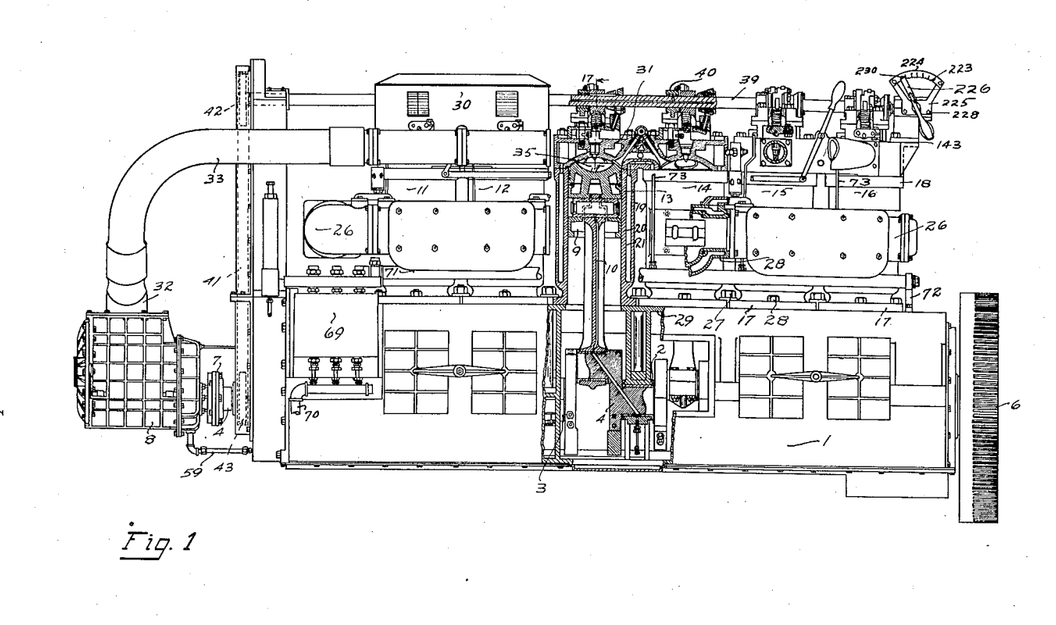
Fig. 1 illustrates mostly in side elevation, and partly in longitudinal medial section, portions of a multi-cylinder engine comprising an embodiment of my invention.
Figure 17:
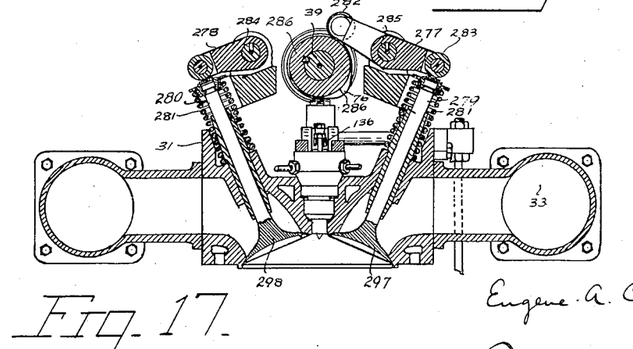
Fig. 17 is a transverse section of the cylinder head on the line 17—17 of Fig. 1.

A cover 30 for one of the twin heads is shown in Fig. 1. One of such heads is shown in longitudinal medial vertical section at 31, Fig. 1, and in transverse vertical section in Fig. 17.

At 8, an air pump, preferably of the rotary type, is provided to supply air to all the cylinders through a common supply conduit 32 branched to provide a pair of air conduits 33. The air supply conduits 33 extend longitudinally on each side of the engine adjacent the cylinder heads 31 and are effective to introduce air through branches to each of the different cylinder chambers 35 through a pair of inlet valve ports provided in the head of each. The valve ports are provided with inlet valves adapted to open and close the ports as hereinafter more specifically described.

A fuel oil pump 69, which is also driven from the engine crank shaft, supplies fuel under the desired pressure, which may range from 3000# per square inch, to any other desired pressure, in some cases very greatly in excess of 3000# per square inch, the fuel oil being admitted through an inlet pipe 70 and discharged therefrom to different cylinders through a discharge conduit 71 which is supported at intervals by supports 72 under a side of the engine. Branching ducts 73 extend therefrom upwardly, each to an inlet 122, Fig. 2, of a fuel injection valve mechanism 101, each individual to a cylinder. A reciprocating needle valve 103 is provided for each injection valve, and is disposed so as to seat to close a miniature nozzle discharge passage 110 extending through the conical tip of the nozzle element 108, which projects slightly into the combustion chamber 35 of the engine cylinder.

One of the said injection valve mechanisms 101 for each cylinder, is rigidly secured to the head 31 above its respective cylinder, preferably axially thereof.

The needle 103 is suitably bushed within the valve 101, by a bushing 113, extending for a considerable portion of its length, and is reciprocated by virtue of the axial reciprocation of its stem 130, by the rock arm lever 136. A valve tappet 153, provided with an operating head 154 at its upper end and contacting by its lower end 155 with an end of the rocker arm 136, engages by its other end the under side of a locked nut 131, screw threaded on to the end of the valve stem 130, to reciprocate the valve, in its bushing.

The nut 131 is locked in a given adjusted position by a lock nut 141. The needle valve 103 is made slender, preferably not more than one-eighth inch in diameter, and at least two inches in length, to avoid the tendency of fluid pressure of the fuel oil to move it, making it unnecessary to provide an unduly stiff spring to close it against such pressure.

In an engine provided with appurtenances as above described, and as illustrated in the drawings, it is very desirable to effect uniform valve actuating movements of the injection needle valve 103 and in order to accomplish this, alike for all of the cylinders, I have provided a novel mechanism whereby a uniform control may be effected for the injection valve of each of the cylinders, simultaneously, and by operation of a single manually operable controlling means. This mechanism involves a rotary shaft 39 common to the injection valves and air inlet valves for all the cylinders, individual cams for operating each of the injection valves, and for operating each pair of air inlet valves being provided, means are also provided whereby to axially, adjustably move the cam shaft to vary the valve actuating movement effected by the individual injection valve cams, without variation of the valve operating movement imparted by the individual air inlet valve operating cams.

The air inlet valve operating cams 299 and the fuel injection operating cams are alternately disposed on the cam shaft, longitudinally thereto. The injection valve operating cam comprises an assembly of apparatus operating as a unit to effect reciprocation of the valve tappet 153.

This apparatus comprises a camming annulus 201 and cam 202 bolted thereon, for each engine cylinder, which are telescoped over the common cam shaft 39, and driven therefrom by motion communicated by a collar 203 having an outer conical surface, non-rotatably secured by a key 204 to the cam shaft.

Figure 2:
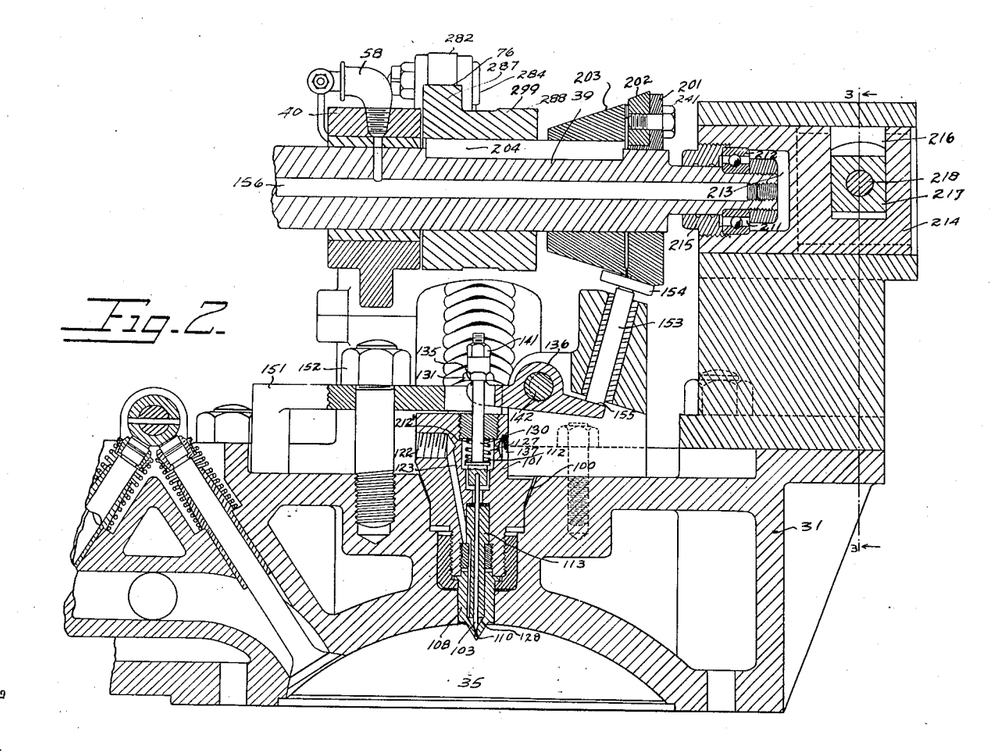
Fig. 2 is a view mostly in longitudinal medial section, enlarged relative to Fig. 1, of certain of the parts shown in Fig. 1, comprising the apparatus operating in connection with an end one of the cylinders and the common throttling means for all of the cylinders of the multi-cylinder engine of Fig. 1.
Figures 3, 18, 19:
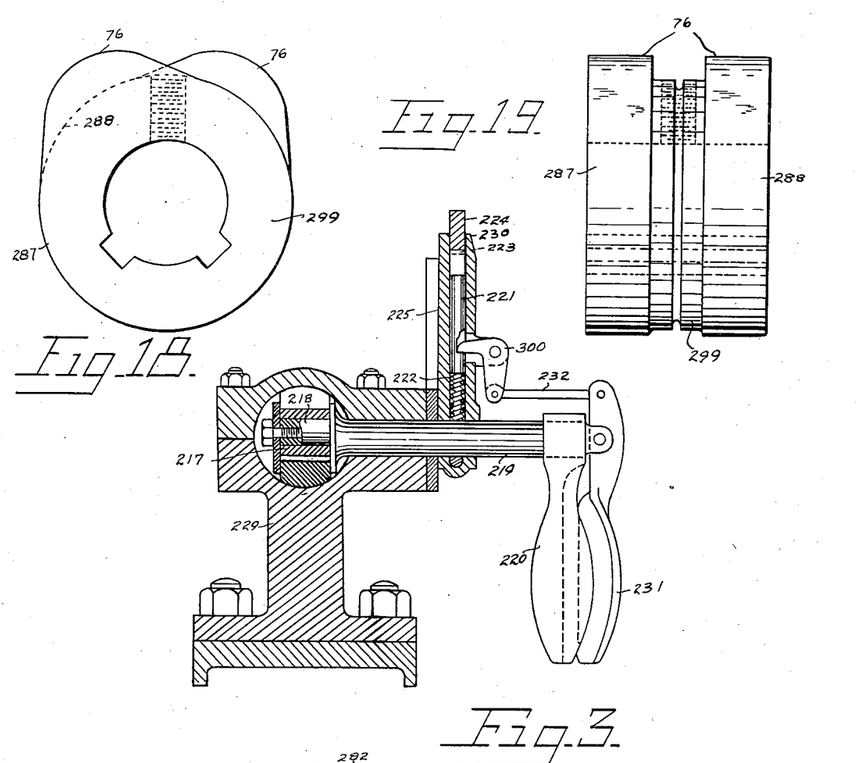
Fig. 3 is a section taken on the line 3—3 of Fig. 2, showing the view at right angles to the view of Figs. 1 and 2 of manually operated means employed to control the adjustment of all of the fuel injection valve operating mechanisms comprised in the said embodiment.
Figs. 18 and 19 are end and side elevational views, respectively of one of the air valve operating cams.
Figure 4:
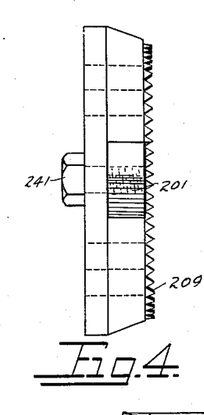
Figure 5:
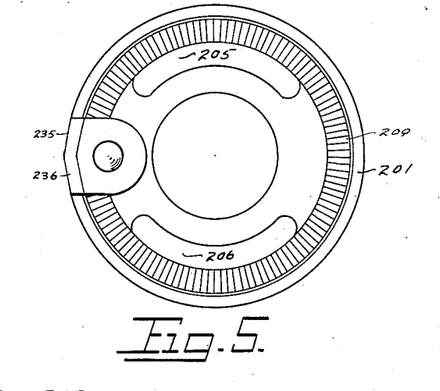
Fig. 5 is an end elevational view of a camming annulus for one of the valve operating mechanisms for each one of the cylinders, six of which, one for each cylinder, are carried on the common cam shaft for all of the cylinders.

A hardened cam insert 202 has a threaded aperture 234 for engagement by the screw 241 passed through an aligned aperture of the annulus 201, as indicated best in Figs. 2 and 4. The cam 202 is best illustrated in Figs. 6 and 7, and comprises a block preferably of hardened steel, having an arcuate inner edge with straight sides 242 and 243, and an operating cam face comprising portions 235, 236 and 237.

The cam 202 is snugly received in a recess of the annulus. The cam is divided into camming portions 235 and 236, and an intermediate portion 237. The surfaces 235 and 236 are inclined longitudinally in the direction of the conical exterior of the annulus 201 and collar 203, converging longitudinally of the crank shaft.

The cam surfaces 235 and 236 are also in lateral directions, curved arcuately from the joining portion 237, the radii for the surfaces 235 and 236 intersecting at a point intermediate the cam surfaces and the centers from which surfaces are determined. The radii are of considerable length, such as 9¾ inches, for the surfaces 235 and 236, whereas the relatively small intermediate joining surface is formed on a relatively small radius, being a fractional part of an inch.

Figure 6:
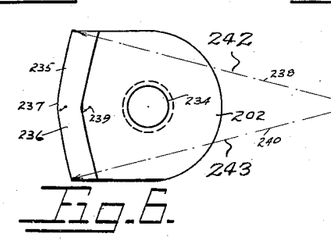
Figs. 6 and 7 are end and side elevational views, respectively, of a cam element, shown in relatively enlarged view, applicable to the annulus of Figs. 4 and 5.
Figure 7:
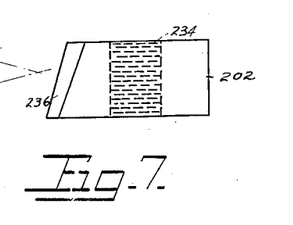
Figure 8:
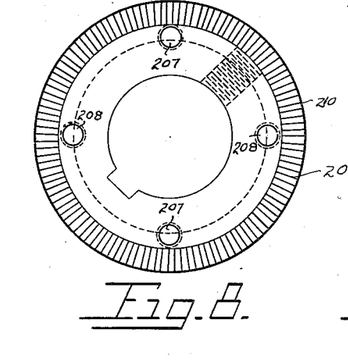
Figs. 8 and 9 are end and side elevational views, respectively, of a supporting annulus for the camming annulus of Figs. 4 and 5.
Figure 9:
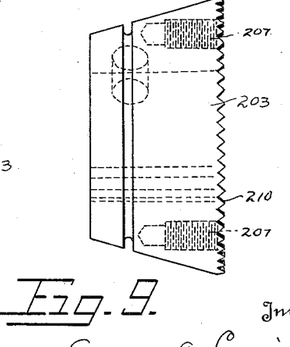

Fig. 6 shows portions of certain of these radii 238, 239 and 240, for portions of the surfaces 235, 237 and 236 respectively.

Each of the annuluses 201 are provided with a pair of concentric arcuate slots 205 and 206 into which a pair of bolts may be projected to enter either pair of threaded holes 207 or 208 in the collar 203, and before the bolts are secured home bringing the toothed face 209 of the annulus into engagement with the teeth 210 on the larger end face of the collar, the two parts being rotated to the desired relative angular positions and then when the bolts are driven home, the interengagement of teeth of the annulus and collar prevent relative angular displacement of the collar and annulus. This arrangement provides an adjustment to determine the point in the rotative travel of the cam shaft 39 which rotates in unison with the engine crank shaft 4, whereat the cam 202 engages the head 154 of the valve tappet 153 to lift the needle valve 103 by rocking the rocker arm 136.

A compression spring 112 is provided to restore the needle valve to its seated position wherein it closes the fuel ejecting passage 110 when the lifting effort exerted by the rocker arm is discontinued.

The cam shaft 39 is adapted not only to rotate in its bearings 40 but may be adjustably reciprocated axially, carrying with it the air-inlet valve operating cams 299, and also the rotary cam mechanism comprising the annuluses 201 rigidly affixed to the collars 203 which are keyed alternately between the cams 299, at intervals to the shaft. Axial reciprocation of the cam shaft effected by the manually adjustable apparatus shown in the upper right-hand corner of the drawing of Fig. 1, which will be later more specifically described, is effective to vary the degree and time period of lifting movement imparted to the needle valve 103 through the instrumentality of the valve operating tappet 153, without disturbing the degree or period of actuation of the pair of air-inlet valves 297 and 298.

Thus whenever the cam shaft with its associated rotary cams is moved axially in a direction as toward the left, at each engagement of the cam 202 carried by the annulus, the injection valve will be moved to open position at an earlier point in the angular rotary movement of the cam shaft and will be held open longer than would be if it were disposed in an adjusted position more toward the right, as viewed in Figure 1, thus increasing the period of opening of the injection valves, to increase the fuel supplied to the cylinders.

Thus all of the injection valve operating cams 202, one for each cylinder, being simultaneously moved to like degree longitudinally, and each having a conical camming face engageable with the head of a like valve operating tappet, which is preferably set at an angle of 90° from the inclination of the opposing portion of the conical cam face of the cams; each of the injection valve operating tappets will alike receive the same differently timed valve-opening impulse to vary, alike, the period during which the injection valve is operated to discharge liquid fuel under high pressure into the engine cylinder.

The valve tappets 153 are provided with enlarged heads 154 of preferably disk form and provided with a cam contacting upper surface which engages with the incline surface of the annulus 201, only along a line extending radially of the axis of the head 154, the line of contact being disposed preferably substantially, entirely to one side of the axis of the valve tappet head. A clearance space is provided between the opposite, non-engaged side of the valve tappet head surface and the preferably conical collar 203. The surface of the annulus 201 engageable with the tappet head 154 is preferably nearly entirely of frustro-conical form, except for the inserted cam portion 202, which is of the true eccentric cam form illustrated in Fig. 6, with inclined cam surfaces joined medially of the cam to effect axial reciprocation of the tappet when the annulus is rotated.

Rotation of the valve tappet 153 in its bearings is accomplished by the engagement of one side of its head surface, preserving, at all times, the minimum of frictional resistance and minimizing wear which would otherwise result from the contact between the cam surfaces and the engaged surface of an otherwise non-rotatable valve tappet head.

The inclination of the valve tappet is preferably that of the inclination of the camming face of the annulus 201, to secure a substantially line contact between the camming annulus and the tappet head along a line extending radially of the tappet head.

The axial adjustment of the cam shaft is effected, preferably, in the following manner. The end of the cam shaft carries a ball bearing mechanism 211, which, by an outer race member 212', is rigidly secured within an end recess 213 of a longitudinally slidable non-rotatable block 214 by a clamping collar 215 screw threaded in the block against the race member 212'. The block 214 is transversely slotted at 216 to admit a rectangular slide piece 217 which is adapted to reciprocate in the slot 216 in vertical directions.

A manually rotatable crank shaft 219, rotatable by manipulation of a handle 220 when rotated, causes movement of an eccentric extension 218 of the shaft 219 and projecting longitudinally therefrom into and through the slide piece 217.

The slide piece is, therefore, carried with the eccentric extension element 218 eccentrically of the crank shaft 219 when it is angularly rotated by its handle, accomplishing lateral translation of the slide piece 217 while it is moved vertically, or rather while it is moved arcuately about the axis of the shaft 219, and the lateral component of movement of the slide piece 217 will effect movements in corresponding longitudinal translatory movement of the cam shaft depending on the rotative adjustment again imparted by the rotation of the handle 220 affixed to the shaft 219.

The shaft 219 is locked in a given adjusted rotative position upon release of the handle 220, by virtue of the provision of a pawl 221 continually pressed by a spring 222 into indenting locking position with teeth or serrations 223 of an arcuate strip quadrant 224 carried on a support 225, which is bolted at 228 to the support 229 carried by the engine head, and which also supports the crank shaft 219 and associated mechanism comprising the bearing mechanism 211 and block 214.

The elongated front plate is pointed at its upper end 230 and the arcuate plate 224 is inscribed, as shown in Fig. 1, with scale divisions whereby the pointer plate 226, indexing with a given scale division on the arcuate plate 224, indicates the axially adjusted position of the cam shaft 39 and the condition as to duration of fuel injection for the different engine cylinders. A linkage comprising a supplementary hand grip 231, rod 232 and crank lever 300 effects, by the free end of the lever, an unlocking downward movement of the pawl 221 when the handle 220 and grip 231 is gripped by the operator preparatory to making an angular adjustment of the shaft 219 and upon release of the hand grip, the spring 222 restores the pawl to locking position with the teeth 223 of the lower arcuate edge of the plate 224.

Preferably two adjustments, individual to each of the engine cylinders, are provided for varying the amount of lift imparted to the needle valve 103 by the reciprocating movement of the valve operating tappet 153.

First, the nut 131 on the threaded end of the valve stem 130 is adjustable longitudinally of the valve stem, and its lower surface therefore may be raised or lowered for earlier or later engagement with the slotted end 135 of the rocker arm 136 and locked in its adjusted position by turning the locking nut 141 tightly down on to it. To maintain the rocker arm normally rotated in counter-clockwise direction as viewed in Fig. 2, the ends 135 of the arm (see Figs. 15 and 16) may be massive and heavy.

Also, the angular position of the rocker arm 136 relative to its supporting shaft 142 may be adjustably varied by rotating the adjustment screw 143 which is provided with external threads 144 in threaded engagement with longitudinally extending teeth 142′ provided on the exterior surface of the shaft 142.

Figures 10, 11, 12, 13, 15, 16:
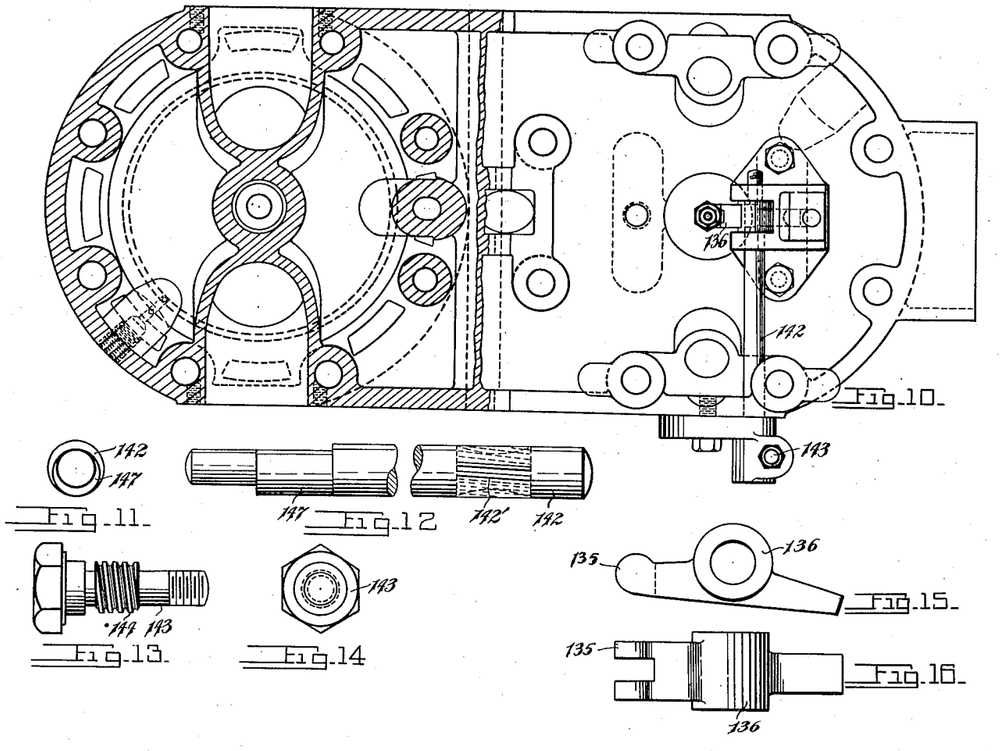

The form of the shaft 142 and the relative position of the rocker arm 136 when disposed thereon, is best shown in Fig. 10, which shows the rocker arm 136 mounted on an eccentrically disposed portion 147 of the shaft 142, and whereby when the relative angularity of the parts 136 and 147 is changed, the rocker shaft 142 will rotate in its bearings and the eccentric portion 147 will be moved in an upward or downward direction, to vary the period of lifting effort imparted to the needle valve 103.

This adjustment is one which may be varied during running of the engine and in order to equalize the work done by all of the cylinders which may be determined in any manner as by noting the temperature existing in the different cylinders and bringing them to a common operating temperature.

The air inlet valves 297 and 298, are provided with valve stems 279 and 280 and are spring pressed by springs 281 upwardly, divergingly, to close the valve openings provided in the cylinder head. Rocker arms 277 and 278 provided with rollers 282 and 283 at their ends are swivelably mounted on short rocker arm shafts 284 and 285 disposed on either side of the cam shaft 39, and parallel thereto. Intermediate the conical injection valve cam mechanisms 202 and likewise keyed onto the cam shaft 39 are disposed the inlet valve operating cams 299 which are telescoped over the shaft 39 and rigidly keyed thereon and provided with valve operating cam projections 76.

The cams 299 have their camming surfaces indicated at 287 and 288 made of sufficient width, measured longitudinally of the shaft 39, that the relatively short adjusting longitudinal movements of the shaft 39 effecting variations in the fuel injection, as previously described, may be accomplished without disturbing the nature of the contacting engagement between the rocker arm rollers 282 and the cam surface.

A pair of projections 76 are provided, each radially displaced and longitudinally spaced on the cam 299 so that both of the rollers 282 on the rocker shafts 77 and 78 will be simultaneously lifted by the respective cam projections 76 of the camming surfaces 287 and 288 and simultaneously retracted to restore the valves.

In other words all positions of the camming surfaces 287 and 288, extend longitudinally in directions parallel to the axis of the cam shaft 39 and by virtue thereof the shaft carrying the cam 299 may be shifted longitudinally without varying the degree or period of actuation of the air inlet valves 297 and 298.

In the operation of the engine, the pistons are successively moved upwardly and downwardly in the cylinders, the air inlet valve being successively opened and reclosed, and the different cam mechanisms each comprising a camming annulus 201 and cam 202 bolted thereto, successively rocking the rocker arm levers 136, through the interposed valve operating tappets 153. The rotary cams being capable of being simultaneously moved to like degree longitudinally upon longitudinal movement of the cam shaft, will in like manner be caused to vary the length of the period during which the needle valve 103 is lifting from its seat, permitting injection of fuel into the engine cylinder. This is accomplished because of the frustro conical form of the operating face of the annuluses 201 and cams 202 secured thereto.

Other portions of the engine and auxiliary equipment are generally of well known types and will not require specific description.

Having thus described my invention in a preferred embodiment, I am aware that numerous and extensive departures may be made from the embodiment herein illustrated and described, but without departing from the spirit of my invention.

I claim:

1. In combination with a multi-cylinder internal combustion engine, a fuel injection valve and a charge controlling valve for each cylinder, a rotatable cam shaft common to the cylinders, a plurality of cams rotatable with the cam shaft and disposed thereon in relatively spaced relation, some only of the said cams being longitudinally tapered to have each a generally conical surface, others of said cams having camming surfaces extending longitudinally in directions parallel to the shaft axis, a cam follower for each of said tapered cams adapted upon rotation of the cam to operate each a fuel injection valve, a mechanical connection between each valve and its associated cam follower to communicate periodic thrust movements of the cam follower to the valve, and means for axially adjusting the shaft to move all of the tapered cams longitudinally simultaneously to cause the tapered cams to vary the movement imparted by said cams to their associated injection valves, the tapered cams being so formed that the said period of time is increased or decreased at both its beginning and ending proportionally to the amount of said axial adjusting movement.

2. In combination with a multi-cylinder internal combustion engine, a fuel injection valve and an air inlet valve for each cylinder, a rotatable cam shaft common to the cylinders, a plurality of cams rotatable with the cam shaft and disposed thereon in relatively spaced relation, some of said cams being longitudinally tapered and adapted upon rotation to operate each an injection valve, means associated with each injection valve for communicating periodic thrust movements from each tapered cam to the valve, including a follower for each tapered cam, means for axially adjusting the shaft to adjustably move all of the cams, the other of said cams on said cam shaft being adapted to rotate with the shaft and adapted on rotation to periodically operate each an air inlet valve, the said air inlet valve operating cams having cam faces so formed that the amplitude of the cam throw thereof is constant at all longitudinally adjusted positions of the shaft, said shaft adjusting means comprising an eccentric device rotatable to shift the shaft longitudinally, and a handle for rotating said eccentric device.

3. In combination with a multi-cylinder internal combustion engine, a fuel injection valve and a charge controlling valve for each cylinder, a rotatable axially movable cam shaft common to the cylinders, a plurality of relatively longitudinally spaced tapered cams secured to and rotatable with the cam shaft, other cams secured to the shaft and disposed thereon alternatively with respect to the tapered cams, a rocker arm interposed between each injection valve and a corresponding cam and adapted to be rocked to operate the valve by movements communicated to it by the cam when rotated, means to axially adjust the cam shaft relative to the rocker arms to move the tapered cams to vary the movement imparted by the tapered cams to their respective fuel injection valves and adjustable means individual to each rocker arm to vary the period of each actuation of the injection valve effected by the arm upon a predetermined rotative movement of the associated cam, said other cams each being adapted, by means including a cam-follower therefor, to effect movements of the charge controlling valves, and being formed to effect said movement without change upon the axial adjustment of the shaft.

4. In a multi-cylinder internal combustion engine, a fuel injection valve and an air inlet valve for each of the cylinders thereof, a cam shaft extending adjacent to all of the valves, a tapered cam for each injection valve and a non-tapered cam for each inlet valve, all said cams rotatable by and with the shaft, common means manually operable to adjustably shift all of the cams axially of the shaft while they are rotating therewith, and means associated with each tapered cam disposed to engage different portions of the tapered surface thereof when the cam is axially shifted to vary the injection valve operating effect of each of the tapered cams upon their respective valves.

5. A valve controlling mechanism for multi-cylinder internal combustion engines comprising, in combination with the fuel injection and air inlet valves for each of the cylinders, a common rotatable cam shaft, a tapered cam and a non-tapered cam for each cylinder rotatable with and supported by the shaft, means effective to move all of the cams alike simultaneously axially of the shaft, and means responsive to axial movement of each of the tapered cams to vary the injection valve operating movement effected thereby, said means comprising a cam follower associated with the valve, and comprising a cam surface for the cam so formed that upon axial adjustment of the cam the time of the valve movement is increased or diminished at both its beginning and its ending proportionately to the amount of the axial movement, said non-tapered cams adapted to effect uniform movements of the air inlet valves independently of the axially adjusted position of the cams.

6. In a multi-cylinder internal combustion engine, a controlling valve for each of the cylinders thereof, a cam shaft extending adjacent to all of the valves, a tapered cam for each valve, all rotatable by and with the shaft, common means operable to adjustably shift all of the cams axially of the shaft while they are rotating therewith, and cam follower means for each cam disposed to engage different portions of the tapered surface thereof when the cam is axially shifted to vary the valve operating effect of each of the cams upon their respective valves, each cam comprising an exteriorly tapered annulus telescoped over the shaft and comprising a longitudinally tapering camming portion, and a collar rigidly secured to the shaft, and means to secure the annulus to the collar in any one of a plurality of relatively angularly displaced relative positions to vary the angular position of the camming portion around the axis of the shaft.

7. In a multi-cylinder internal combustion engine, a controlling valve for each of the cylinders thereof, a cam shaft extending adjacent to all of the valves, a tapered cam for each valve, all rotatable by and with the shaft, common means operable to adjustably shift all of the cams axially of the shaft while they are rotating therewith, and means for each cam disposed to engage different portions of the tapered surface thereof when the cam is axially shifted to vary the valve operating effect of each of the cams upon their respective valves, each cam comprising an exteriorly tapered annulus telescoped over the shaft and comprising a longitudinally tapering camming portion, and a collar rigidly secured to the shaft, and means to secure the annulus to the collar in any one of a plurality of relatively angularly displaced relative positions to vary the angular position of the camming portion around the axis of the shaft, said means comprising contacting serrated surfaces of the collar and annulus adapted to be relatively disposed in interlocked relation.

8. In combination with a multi-cylinder internal combustion engine, a fuel injection valve for each cylinder, a rotatable cam shaft common to the valves, a plurality of relatively longitudinally spaced tapered cams, each rotatable with the cam shaft, a rocker arm interposed between each valve and the cam, and adapted to be rocked to operate the valve by movements communicated to it by the cam, means to axially adjust the cam shaft relative to the rocker arms, to vary the movement imparted by the cams to their respective rocker arms, and adjustable means individual to each rocker arm to vary the period of each actuation of the valve effected by the arm upon a predetermined rotative movement of the associated cam, in accordance with the axial adjustment of the cams said adjustable means comprising a shaft for each rocker arm having an eccentric arm supporting portion, and means for locking the eccentric portion of the shaft in any of a plurality of relatively different angular positions.

9. In combination with a multi-cylinder internal combustion engine, a fuel injection valve for each cylinder, a rotatable cam shaft common to the valves, a plurality of relatively longitudinally spaced tapered cams, each rotatable with the cam shaft, a rocker arm interposed between each valve and the cam, and adapted to be rocked to operate the valve by movements communicated to it by the cam, means to axially adjust the cam shaft relative to the rocker arms, to vary the movement imparted by the cams to their respective rocker arms, and adjustable means individual to each rocker arm to vary the period of each actuation of the valve effected by the arm upon a predetermined rotative movement of the associated cam, in accordance with the axial adjustment of the cams said adjustable means comprising a shaft for each rocker arm having an eccentric arm supporting portion, and means for locking the eccentric portion of the shaft in any of a plurality of relatively different angular positions, and means to communicate rocking movements to the rocker arm comprising a longitudinally shiftable link interposed between an end of the rocker arm and the tapered surface of the cam.

10. In combination with a multi-cylinder internal combustion engine, a fuel injection valve for each cylinder, a rotatable cam shaft common to the cylinders, a plurality of cams rotatable with the cam shaft disposed in relatively spaced relation, each of said cams being longitudinally tapered, and adapted upon rotation to operate a valve, cam follower means for each valve interposed between it and its associated cam, so disposed as to communicate periodic thrust movements of the cam to the valve, and means to axially adjust all the cams longitudinally to vary the movement imparted by said cams to their associated valves through said means, said adjusting means comprising eccentric means rotatable to shift the shaft longitudinally, a handle for rotating said eccentric means, a handle shaft joining the handle and the eccentric means, a detent operable responsive to release of the handle to hold the handle shaft in any given adjusted rotative position, and means rotatable with the handle shaft adapted to indicate the angularly adjusted position thereof.

11. In an internal combustion engine, a valve therefor, a rotary axially tapering cam, a rocker arm, said rocker arm adapted to be rocked to communicate a reciprocatory movement to the valve from the cam, and means adapted to vary the period of each actuation of the valve effected by the arm upon a predetermined rotative movement of the cam, said means comprising means for axially adjusting the said cam, and an eccentrically disposed portion of the shaft supporting said rocker arm, and adjustable means for varying the angular relation of the arm to the said eccentric portion.

12. In an internal combustion engine, a valve therefor, a rotary axially tapering cam, a rocker arm, said rocker arm adapted to be rocked to communicate a reciprocatory movement to the valve from the cam, and means adapted to vary the period of each actuation of the valve effected by the arm upon a predetermined rotative movement of the cam, said means comprising means for axially adjusting said cam, and an eccentrically disposed portion of the shaft supporting said rocker arm, and adjustable means for varying the angular relation of the arm to the said eccentric portion, said adjusting means comprising an adjusting screw, a longitudinally extending tooth associated with the said shaft eccentric portion and said tooth meshed with the threads of the screw.

13. In a valve operating mechanism, a valve tappet, bearings for the tappet within which the tappet may rotate and reciprocate, a rotary substantially frustro-conical cam, said cam comprising a generally conical camming projection extending outwardly from a portion of its peripheral frustro-conical surface, the tappet being positioned with a head end thereof adjacent the frustro-conical surface, the tappet having a head disposed adjacent the frustro-conical surface and maintained in engagement with the same and with the cam projection thereof, along a line of contact extending radially of the tappet axis and mostly at one side of the said axis and along lines of contact of the said cam and projection extending longitudinally of the cam axis, whereby the cam may be continuously rotated in its bearings and reciprocated by the cooperative effect of the said camming projection and cam.

14. In a valve operating mechanism, a valve tappet, bearings for the tappet within which the tappet may rotate and reciprocate, a rotary substantially frustro-conical cam, said cam comprising a generally conical camming projection extending outwardly from a portion of its peripheral frustro-conical surface, the tappet being positioned with a head end thereof adjacent the frustro-conical surface, the tappet having a head disposed adjacent the frustro-conical surface and maintained in engagement with the same and with the camming projection along a line of contact extending radially of the tappet axis and mostly at one side of the said axis and along lines of contact of the said cam and projection extending longitudinally of the cam axis, whereby the cam may be continuously rotated in its bearings and reciprocated by the cooperative effect of the said camming projection and cam, a valve adapted to be periodically moved to successive valve port opening and valve port closing positions by the successive reciprocatory movement of the tappet, and means to vary the reciprocatory movement imparted to the valve comprising means to relatively adjust the cam and tappet longitudinally of the rotational axis of the cam.

15. In a valve operating mechanism, a valve tappet, bearings for the tappet within which the tappet may rotate and reciprocate, a rotary substantially frustro-conical cam, said cam comprising a generally conical camming projection extending outwardly from a portion of its peripheral frustro-conical surface, the tappet being positioned with a head end thereof adjacent the frustro-conical surface, the tappet having a head disposed adjacent the frustro-conical surface and maintained in engagement with the same and with the camming projection, along a line of contact extending radially of the tappet axis and mostly at one side of the said axis and along lines of contact of the said cam and projection extending longitudinally of the cam axis, whereby the cam may be continuously rotated in its bearings and reciprocated by the cooperative effect of the said camming projection and cam, and means to vary the reciprocatory movement of the tappet effected by rotation of the cam comprising means for effecting an axial shifting of the cam relative to the engaged head of the tappet.

16. In a valve operating mechanism, a valve tappet, bearings for the tappet within which the tappet may rotate and reciprocate, a rotary substantially frustro-conical cam, said cam comprising a generally conical camming projection extending outwardly from a portion of its peripheral frustro-conical surface, the tappet being positioned with a head end thereof adjacent the frustro-conical surface, along a line of contact extending radially of the tappet axis and mostly at one side of the said axis and along lines of contact of the said cam and projection extending longitudinally of the cam axis, whereby the cam may be continuously rotated in its bearings and reciprocated by the cooperative effect of the said camming projection and said cam, and means to vary the reciprocatory movement of the tappet effected by rotation of the cam comprising means for effecting an axial shifting of the cam relative to the engaged head of the tappet, said means comprising a cam shaft, said cam telescoped over the shaft and rigidly secured thereon, bearings for the shaft adapted to permit longitudinal movement of the shaft therein, and means for adjustably axially positioning the shaft in said bearings.

17. A mechanical movement comprising a rotary substantially frustro-conical cam, comprising an inclined camming projection extending outwardly from a portion of the substantially frustro-conical peripheral surface thereof, a reciprocatory tappet maintained in yielding engagement with the camming projection and the cam, said tappet comprising a head end surface normally adjacent to the cam, said tappet extending laterally from the cam with its axis substantially at right angles to the engaged surface of the cam, including said camming projection.

18. A mechanical movement comprising a rotary substantially frustro-conical cam, comprising an inclined camming projection extending outwardly from a portion of the substantially frustro-conical peripheral surface thereof, a reciprocatory tappet maintained in yielding engagement with the camming projection and the cam, said tappet comprising a head end surface normally adjacent to the cam, said tappet extending laterally from the cam with its axis substantially at right angles to the engaged surface of the cam, including said camming projection, the head surface engaged by the cam being disposed at one side of the tappet axis.

19. A mechanical movement comprising a rotary substantially frustro-conical cam, comprising an inclined camming projection extending outwardly from a portion of the substantially frustro-conical peripheral surface thereof, a reciprocatory tappet maintained in yielding engagement with the camming projection and the cam, said tappet comprising a head end surface normally adjacent to the cam, said tappet extending laterally from the cam with its axis substantially at right angles to the engaged surface of the cam, including said camming projection, the head surface engaged by the cam being disposed at one side of the tappet axis, said head and cam making contact along a line of contact extending radially with respect to the tappet axis and mostly at one side of the said axis, whereby the tappet is continuously rotated in its bearings while reciprocated by the camming effect of the camming projection.

20. In combination with a multi-cylinder internal combustion engine, a fuel injection valve and a charge controlling valve for each cylinder, a rotatable cam shaft common to the cylinders, a plurality of cams rotatable with the cam shaft and disposed thereon in relatively spaced relation, some only of the said cams being longitudinally tapered to have each a generally conical surface, others of said cams having camming surfaces extending longitudinally in directions parallel to the shaft axis, a cam follower for each of said tapered cams adapted upon rotation of the cam to operate each a fuel injection valve, a mechanical connection between each valve and its associated cam follower to communicate periodic thrust movements of the cam follower to the valve, and means for axially adjusting the shaft to move all of the tapered cams longitudinally simultaneously to cause the tapered cams to vary the movement imparted by said cams to their associated injection valves, the tapered cams being so formed that the said period of time is increased or decreased at both its beginning and ending proportionally to the amount of said axial adjusting movement, and that the amplitude of such movement is concurrently varied.

21. In a multi-cylinder internal combustion engine, a controlling valve for each of the cylinders thereof, a cam shaft extending adjacent to all of the valves, a tapered cam for each valve all mounted for rotation by and with the shaft, common means operable to adjustably shift all of the cams axially of the shaft while they are rotating therewith, and cam follower means for each cam disposed to engage different portions of the tapered surface thereof when the cam is axially shifted to vary the valve operating effect of each of the cams upon their respective valves, each cam comprising an exteriorly tapered annulus telescoped over the shaft and comprising a longitudinally tapering camming portion and a collar connected to the shaft in a manner to be rotated thereby, and means to secure the annulus to the collar in any one of a plurality of relatively angularly displaced relative positions to vary the angular position of the camming portion around the axis of the shaft.

22. In combination with a multi-cylinder internal combustion engine, a fuel injection valve for each cylinder, a rotatable cam shaft common to the cylinders, a plurality of cams rotatable with the cam shaft and disposed thereon in relatively spaced relation, said cams being longitudinally tapered to have each a generally conical surface, a cam follower for each of said tapered cams adapted upon rotation of the cam to operate each a fuel injection valve, a mechanical connection between each valve and its associated cam follower to communicate periodic thrust movements of the cam follower to the valve, and means for axially adjusting the shaft to move all of the tapered cams longitudinally simultaneously to cause the tapered cams to vary the movement imparted by said cams to their associated injection valves, the tapered cams being so formed that the said period of time is increased or decreased at both its beginning and ending proportionally to the amount of said axial adjusting movement, and that the amplitude of such movement is concurrently varied.

In testimony whereof I hereunto affix my signature this 6th day of July, 1928.

EUGENE A. CANNING.